2,745,830
Patented May 15, 1956

2,745,830

DERIVATIVES OF 4:4'-DIAMINOSTILBENE DISULFONIC ACID-(2:2')

Adolf-Emil Siegrist, Basel, Switzerland, assignor to Ciba Limited, Basel, Switzerland, a Swiss firm No Drawing. Application September 11, 1952, Serial No. 309,135

Claims priority, application Switzerland September 13, 1951

8 Claims. (Cl. 260—249.6)

The present invention relates to derivatives of 4:4'-diaminostilbene disulfonic acid-(2:2') of the general formula

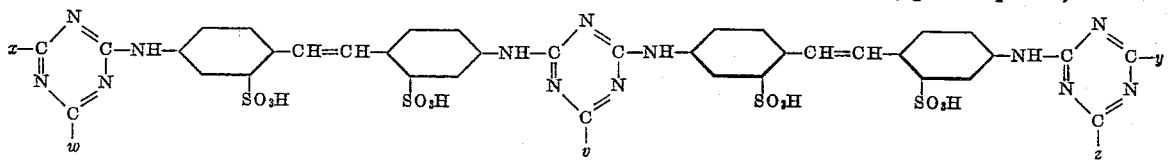

in which $v$, $w$ and $z$ indicate $NH_2$ or the residue of a primary or secondary amine which is attached by the nitrogen atom to the triazine ring, and $x$ and $y$ indicate chlorine, the residue of an aromatic hydroxyl compound attached by way of an —O— bridge to the C-atom of the triazine ring, or of an aliphatic or aromatic mercapto compound attached by an —S— bridge to the C-atom of the triazine ring, or a residue of the kind of $w$ or $z$, and the salts thereof.

The compounds of the general formula set forth, or the salts thereof, are obtained when, in suitable sequence, according to conventional methods, 2 mols of a 4-aminostilbene disulfonic acid-(2:2') which contains in the 4'-position a group convertible into an amino group, or a salt thereof, are reacted with 3 mols of cyanuric chloride and 3–5 mols of ammonia or 3–5 mols of an amino compound containing a primary or secondary amino group, or with 2 mols of an aromatic hydroxyl compound and 3 mols of ammonia or 3 mols of an amino compound containing a primary or secondary amino group or with 2 mols of an aliphatic or aromatic mercapto compound and 3 mols of ammonia or 3 mols of an amino compound containing a primary or secondary amino group, the group which is convertible into an amino group being converted into such a group at a suitable stage of the intermediate products produced.

The new compounds of the formula set forth and also the salts thereof have no dyestuff character in the narrow sense but, according to their constitution, possess a more or less pronounced affinity for various substrata, such as vegetable fibers. On these substrata they exhibit a blue to violet fluorescence in ultraviolet light. On account of this property, the products of the invention are capable of improving the white content in the case of undyed material and the purity of the shade in the case of dyed material.

As 4-aminostilbene disulfonic acids-(2:2') which contain in 4'-position a group convertible into an amino group, there are concerned, for example, such as contain an acylamino group in 4'-position. Preferably however 4-amino-4'-nitrostilbene disulfonic acid-(2:2') is used.

Among the mercapto compounds to be used as starting materials there are concerned, in the aliphatic series, the saturated, unsaturated, straight chain or branched mercaptans with, for example, 1–10 carbon atoms, which compounds may contain in addition to a mercapto group, further substituents such as halogen atoms or carboxyl or sulfonic acid groups. There may be mentioned allyl mercaptan, amyl mercaptan, thioglycollic acid or thioethylene glycol.

The aromatic hydroxyl and mercapto compounds applicable according to the invention may be derived from any aromatic base compounds, primarily however from benzene and naphthalene. They may contain in addition to an OH- or SH- group, further substituents such as halogen atoms, alkyl groups, etherified hydroxyl groups, acylated or dialkylated amino groups, also carboxylic acid or sulfonic acid groups. There may be specifically mentioned phenol, o-, m-, p-chlorophenol, 2:4-dichlorophenol, o-, m-, p-cresol, halogenated cresols, p-bromophenol, naphthols, p-tertiary butyl phenol, salicylic acid, p-hydroxybenzoic acid, phenol sulfonic acids, thymol, guaiacol, further thiophenol and its substitution products.

As primary and secondary amines for the reaction of the invention there are concerned aliphatic, aromatic, araliphatic or heterocyclic amines. As aliphatic amines there are preferably used for the reaction alkylamines, dialkylamines, hydroxyalkylamines, bis-(hydroxyalkyl)-amines and N':N'-dialkyl-alkylene diamines. Both straight chain and also branched, saturated and unsaturated representatives of these compounds with, for example, 1–18 C-atoms can be used. Among them, those with carbon chains of 1–4 C-atoms are especially suitable. There may be mentioned, for example, methylamine, ethylamine, propylamine, isopropylamine, butylamine, isobutylamine, allylamine, monoethanolamine, di-isobutyl-amine and N':N'-diethyl-ethylene diamine. Aliphatic amines, such as taurine, for example, which are substituted in the alkyl radical can also be used.

The aromatic amines may be mono- or polynuclear and if desired may be further substituted. There are used preferably aniline and its nuclear substitution products, as, for example, o- or p-toluidine, various chloranilines and o- or p-anisidine. Naphthylamines, such as α- or β-naphthylamine and their nuclear substitution products can also be used for the reaction of the invention.

The heterocyclic amines which can be used according to the invention may contain one or more hetero-atoms. There may be mentioned piperidine, α-pipecoline, morpholine, pyrrolidine, imidazole, benzimidazole, 2-aminothiazole, 5-aminotetrazole and tetrahydroquinone. The araliphatic amines are preferably derived from benzylamine, as for example, 4-chloro- or 4-methylbenzylamine.

As salts of the products of the invention there are primarily concerned their water-soluble salts with ammonia or amines, but preferably their alkali salts.

For the manufacture of the new compounds according to the invention it is possible, for example, to proceed in such a manner that first as intermediate product a compound is produced of the general formula

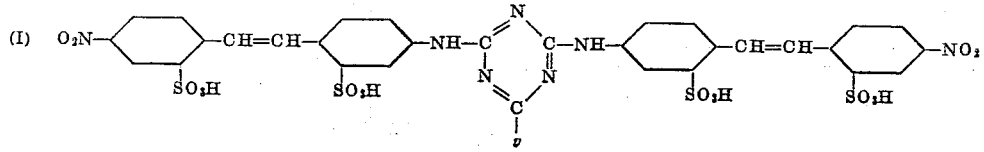

in which $v$ has the significance set forth above.

The preparation of this intermediate product can take place, for example, in such a way that one mol of cyanuric chloride is reacted with 2 mols of 4-amino-4'-nitrostilbene disulfonic acid-(2:2') or a salt thereof by one of the conventional methods for the reaction of cyanuric chloride with amines, for example in the presence of water or mixtures of water with organic solvents, such as acetone, and if desired in the presence of buffer substances or acid-binding agents, such as sodium acetate, alkali carbonates or alkali hydroxides and the condensation product subsequently reacted in the presence of buffer substances or acid-binding agents, such as sodium acetate, alkali carbonates or alkali hydroxides, with one mol of ammonia or one mol of a primary or secondary amine. It is also possible first to react one mol of cyanuric chloride with one mol of an amino compound and then to condense one mol of the condensation product thus produced with 2 mols of 4-amino-4'-nitrostilbene disulfonic acid-(2:2').

For the production of the end product, the nitro groups of the intermediate product I are then reduced to amino groups, which can be effected, for example, with iron in the presence of an acid; one mol of the reduction product is then condensed with 2 mols of cyanuric chloride and the condensation product obtained in this way reacted with 2-4 mols of ammonia or 2-4 mols of one of the above-mentioned amino compounds or with 2 mols of an aromatic hydroxyl compound and 2 mols of ammonia or 2 mols of an amino compound or with 2 mols of an aliphatic or aromatic mercapto compound and 2 mols of ammonia or 2 mols of an amino compound. It is also possible to react one mol of the reduction product from the intermediate product I with 2 mols of a derivative of cyanuric chloride in which 1-2 chlorine atoms have been replaced by reaction with hydroxyl, mercapto or amino compounds.

By carrying out the reaction sequence set forth above symmetrical products will preferably be produced.

For the manufacture of symmetrical and also asymmetrical compounds, it is possible to proceed in such a manner, for example, that the intermediate product II of the general formula

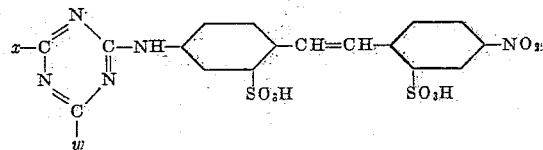

in which $x$ and $w$ have the significance set forth above, is first produced.

The production of this intermediate product can take place in such a manner that one mol of cyanuric chloride is first reacted with 1 mol of 4-amino-4'-nitrostilbene disulfonic acid-(2:2') and then with 1-2 mols of ammonia or 1-2 mols of an amino compound or with 1 mol of an aromatic hydroxyl compound and 1 mol of ammonia or 1 mol of an amino compound or with 1 mol of an aliphatic or aromatic mercapto compound and 1 mol of ammonia or 1 mol of an amino compound. The condensation can also be carried out in the reverse sequence. The intermediate product II can be used in various ways for the synthesis of the compounds of the first general formula, set forth above. The nitro group has first to be converted into the amino group. From this reduction product there can be produced the intermediate product III of the general formula

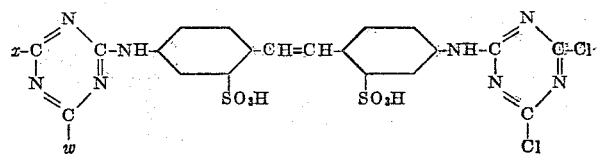

in which $w$ and $x$ have the significance set forth above, by reacting one mol of the reduction product from the intermediate product II with one mol of cyanuric chloride.

For the synthesis of the end products, the intermediate product III can be condensed with the reduction product from the intermediate product II and then reacted further with 1 mol of ammonia or 1 mol of an amino compound. If the substituents $w$ and $x$ in the intermediate product and in the reduction product are the same, symmetrical compounds are obtained, if they are different asymmetrical products are produced.

The end products of the synthesis are also obtainable when 2 mols of the reduction product of the intermediate product II are reacted with 1 mol of cyanuric chloride and subsequently with 1 mol of ammonia or 1 mol of an amino compound.

Finally the compounds of the first general formula set forth above can also be obtained when 1 mol of the intermediate product III is condensed with 1 mol of 4-amino-4'-nitrostilbene disulfonic acid-(2:2'), the nitro group reduced in the condensation product and, in any sequence, 1 mol of cyanuric chloride reacted with 1 mol of the reduction product and 2-3 mols of ammonia or 2-3 mols of an amino compound or with 1 mol of an aromatic hydroxyl compound and 2 mols of ammonia or 2 mols of an amino compound or with 1 mol of an aliphatic or aromatic mercapto compound and 2 mols of ammonia or 2 mols of an amino compound.

Mixtures of compounds in accordance with the invention, which however possess essentially the same properties as the individual compounds, are obtained when instead of individual hydroxyl, mercapto or amino compounds, mixtures of such compounds are used.

If there is used for the synthesis, instead of the 4-amino-4'-nitrostilbene disulfonic acid-(2:2') a 4-aminostilbene disulfonic acid-(2:2') having an acylamino group in 4'-position, then, in the reaction sequences set forth above, instead of the reduction of the nitro group a hydrolysis of the acylamino group to the free amino group must be carried out.

The application of the new products obtainable according to the invention can take place in such a manner that the material to be improved is impregnated with solutions, especially aqueous solutions, of the compounds specified and, after hydroextracting or squeezing out, dried. For example, white goods, especially after a wash carried out in the customary manner, can be aftertreated with the products of the invention. The new products can also be used for the after-treatment of printed cellulosic materials.

The products obtainable according to the present process can also be applied in the course of the manufacturing process of the materials to be improved. They are especially suitable for addition to a paper pulp in the manufacture of paper.

In general, small quantities of the products obtainable according to the invention suffice for the production of an improved effect.

The compounds obtainable according to the present process can also, on account of their great substantivity, be added with especial advantage to washing agents; as washing agents there are suitable, for example, soaps, salts of sulfonated washing agents, as, for example, of sulfonated benzimidazoles substituted on the 2-carbon atom by higher alkyl radicals, also salts of monocarboxylic acid esters of 4-sulfophthalic acid with higher fatty alcohols and furthermore salts of fatty alcohol sulfonates or condensation products of higher fatty acids with aliphatic hydroxy or amino sulfonic acids or salts of alkylaryl sulfonic acids and finally non-ionic washing agents, such as condensation products of alkylene oxides and higher molecular aliphatic alcohols or amines. Washing agents produced according to the invention can also contain the customary additional substances for washing agents, such as phosphates, pyrophosphates, silicates, perborate or percarbonates.

The manufacture of the mixtures of the washing agents and optical bleaching agents takes place in a simple manner by mixing and/or grinding of the components. In this operation it may be of advantage for easier distribution to use one or other of the components in the dissolved or melted condition.

In general a small addition to the washing agents of the derivatives of 4:4'-diaminostilbene disulfonic acid-(2:2') of the general formula first set forth above proves to be sufficient.

80° C. and stirring is carried out for 6–8 hours at 80–85° C.

The condensation product formed is separated by the introduction of sodium chloride, filtered off, washed neutral with sodium chloride solution and then reduced. For this purpose, the product is introduced at 90–100° C. within one hour into a mixture of 30 parts of glacial acetic acid, 132 parts of iron filings and 1500 parts of water. As soon as the nitro-compound has disappeared, the reaction mixture is rendered alkaline at 50–60° C. with sodium carbonate, filtered and the acid formed, of the formula

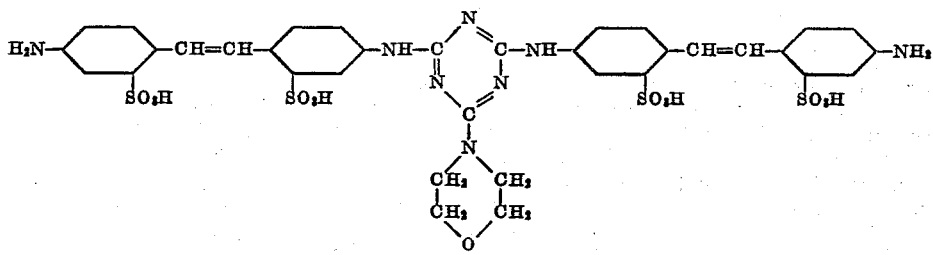

The washing agents of this invention are used according to the customary washing processes. In this manner the materials to be cleansed can at the same time be washed and bleached.

As materials which can be improved the following may, for example, be mentioned:

Cellulosic materials such as cellulose, paper and textile materials of cotton, linen and regenerated cellulose, including staple fiber. The material to improved may exist in any form, for example in fiber form or also as a film. Moreover the material can be, for example, undyed, dyed or printed.

The following examples illustrate the invention, the parts being by weight:

*Example 1*

A solution of 18.5 parts of cyanuric chloride in 100 parts of acetone is stirred into a mixture of 100 parts of ice and 100 parts of water and to the suspension obtained there is gradually added at 0–5° C. within 15–20 minutes, a solution, rendered neutral with sodium carbonate, of 80 parts of 4-nitro-4'-aminostilbene-disulfonic acid-(2:2') in 1000 parts of water, while stirring. Thereupon, within one hour, there is gradually added to the reaction mixture obtained, a solution of 55 parts of sodium carbonate in 50 parts of water, in such a manner that the mixture continually reacts neutral to weakly acid. The temperature is subsequently raised within one hour to 30–35° C. and stirring carried out for 4 hours at this temperature, the hydrochloric acid produced being during the entire procedure neutralized by gradual addition of a solution of 5.5 parts of sodium carbonate in 50 parts of water. A clear, amine-free and practically neutral solution is obtained. There are now further added to the reaction mixture 17.4 parts of morpholine, the temperature is raised within one hour to precipitated from the filtrate by addition of dilute hydrochloric acid, filtered, washed free from mineral acid with water and dried.

A solution of 39 parts of cyanuric chloride in 100 parts of acetone is stirred into a mixture of 200 parts of ice and 200 parts of water and to the suspension obtained, at 0–5° C., within 10 minutes, the solution of the above-mentioned condensation product, neutralized with sodium carbonate, is gradually added with stirring. Thereupon there is gradually added to the reaction mixture obtained, within one hour, a solution of 11.2 parts of sodium carbonate in 100 parts of water, the addition being made in such a manner that the mixture always reacts neutral to weakly acid, the temperature not being allowed to rise above 10° C. Then 25.2 parts of aqueous 70 per cent monoethylamine solution are introduced, the temperature raised within one hour to 35° C. and stirring carried out for 4 hours at this temperature. The disodium salt produced of the condensation product of the formula

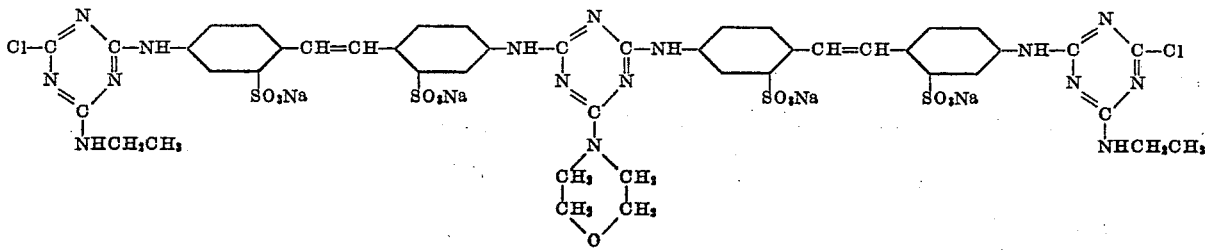

is separated by addition of sodium chloride, filtered, washed with sodium chloride solution and dried. The new product is obtained as a light yellow water-soluble powder.

By using instead of the monoethylamine solution used above, an equimolecular quantity of monoethanolamine, a product is obtained with similar properties. The products can be used as brightening agents for cellulosic materials.

*Example 2*

A solution of 39 parts of cyanuric chloride in 100 parts of acetone is stirred into a mixture of 200 parts of ice and 200 parts of water and to the suspension obtained, at 0–5° C. and within 10 minutes, there is gradually added with stirring the neutral solution of the condensation product of the formula

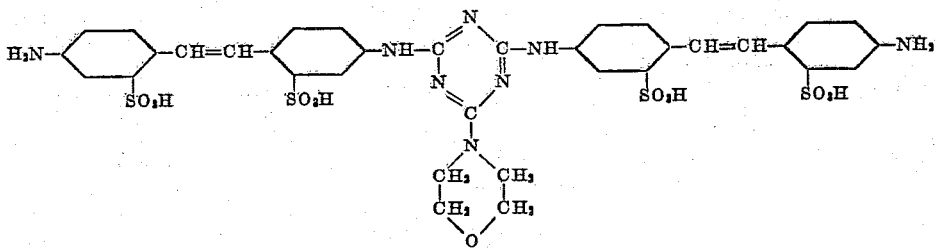

prepared according to Example 1. Thereupon there is gradually added to the reaction mixture obtained, within one hour, a solution of 11.2 parts of sodium carbonate in 100 parts of water, the addition being made in such a manner that the mixture always reacts neutral to weakly acid, the temperature not being allowed to rise above 10° C. Then 12.2 parts of monoethanolamine are introduced, the temperature raised within one hour to 35° C. and stirring carried out for 4 hours at this temperature. The hydrochloric acid produced is neutralized by gradual addition of a solution of 11.2 parts of sodium carbonate in 100 parts of water. Finally there are further added to the reaction mixture 37.2 parts of aniline and the temperature is raised to 80° C. and stirring carried out for 6–8 hours at 80–85° C.

The condensation product formed of the formula is separated by addition of sodium chloride, filtered, washed neutral with sodium chloride solution and dried.

The new product is obtained as a light yellow, water-soluble powder.

By using instead of the aniline used above, equimolecular quantities of monoethanolamine, monoethylamine or morpholine, products are obtained with similar properties. The products can be used as brightening agents for cellulosic materials.

*Example 3*

33.3 parts of the condensation product obtained according to Example 1, of the formula

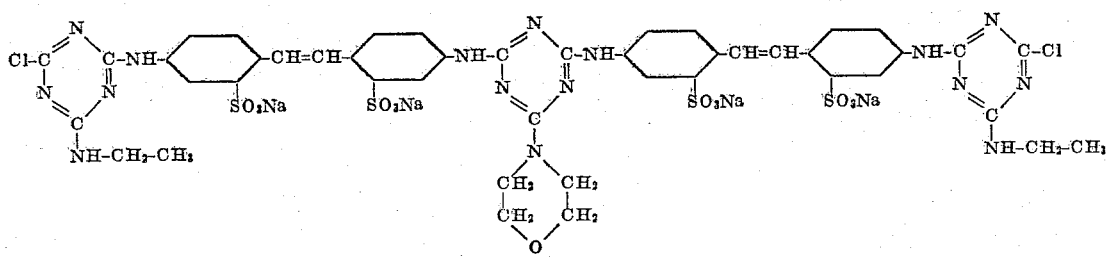

are dissolved in 500 parts of water and treated with 4.8 parts of a 70 per cent aqueous monoethylamine solution. The temperature is raised within 1 hour to 80° C. and

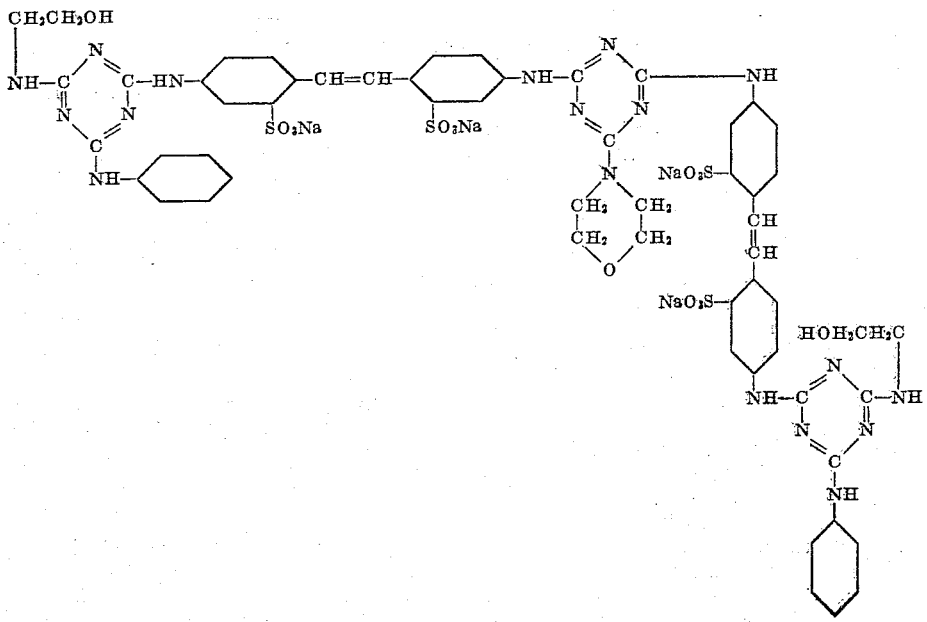

stirring is carried out for 6–8 hours at 80–85° C. The condensation product formed of the formula

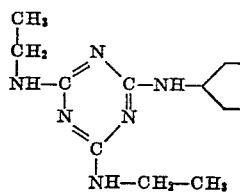
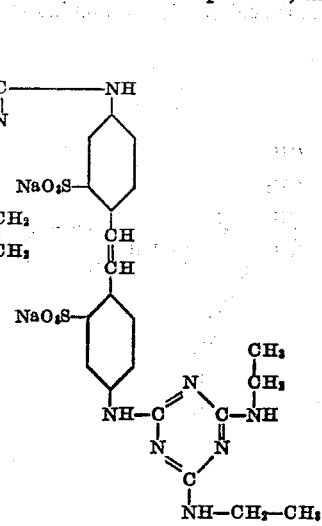

is separated by addition of sodium chloride, filtered, washed with sodium chloride solution and dried. The new product is obtained as a light yellow water-soluble powder.

The product is suitable as a brightening agent for cellulosic materials.

By using instead of the monoethylamine solution specified above, an equimolecular quantity of ammonia solution, a product with similar properties is obtained.

in 1 hour to 30–35° C. and stirring is carried out for 3–4 hours at this temperature, the hydrochloric acid produced being continuously neutralized by gradual dropwise addition of a solution of 5.5 parts of sodium carbonate in 50 parts of water. A clear, amine-free and practically neutrally reacting solution is obtained. 23.2 parts of aniline are further added to the reaction mixture, the temperature is raised within 1 hour to 80° C. and stirring is carried out for 6–8 hours at 80–85° C.

The condensation product formed, of the formula

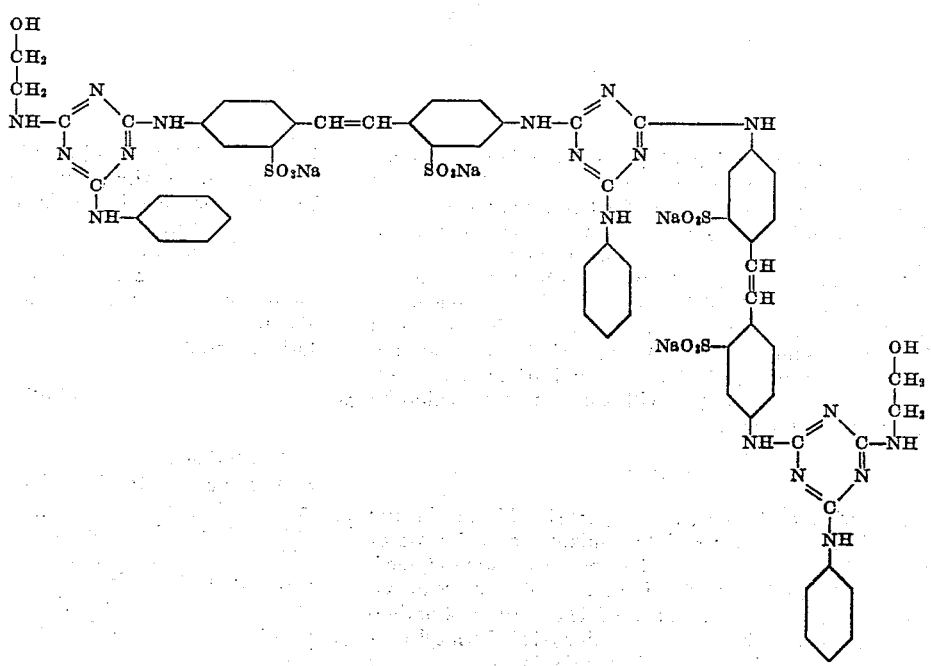

Example 4

A solution of 18.5 parts of cyanuric chloride in 100 parts of acetone is stirred into a mixture of 100 parts of ice and 100 parts of water and to the suspension obtained there is added dropwise with stirring at 0–5° C., within 10–20 minutes, a solution, rendered neutral with sodium carbonate, of 120 parts of 4-amino-4'-[2-($\beta$-hydroxyethylamino)-4-anilino-1:3:5-triazyl-(6)-amino] - stilbene disulfonic acid-(2:2') in 1000 parts of water. Thereupon there is added dropwise to the reaction mixture obtained, within 1 hour, a solution of 5.5 parts of sodium carbonate in 50 parts of water, the addition being made in such a manner that the mixture always reacts neutral to weakly acid. Subsequently the temperature is raised within 1 hour to 30–35° C. and stirring is carried out for 3–4 hours at this temperature, the hydrochloric acid produced being continuously neutralized by gradual dropwise addition of a solution of 5.5 parts of sodium carbonate in 50 parts of water. A clear, amine-free and practically neutrally reacting solution is obtained. 23.2 parts of aniline are further added to the reaction mixture, the temperature is raised within 1 hour to 80° C. and stirring is carried out for 6–8 hours at 80–85° C.

is separated by addition of sodium chloride, filtered, washed neutral with sodium chloride solution and dried. The new product is obtained as a light yellow, water-soluble powder.

By using instead of the quantity of aniline last-mentioned, an equimolecular quantity of monoethylamine or monoethanolamine, products with similar properties are obtained. The products can be used as brightening agents for cellulosic materials.

Products with similar properties are likewise obtained when instead of the initially mentioned 4-amino-4'-[2-($\beta$-hydroxyethylamino)-4-anilino-1:3:5-triazyl - (6) - amino]-stilbene disulfonic acid-(2:2') an equimolecular quantity of 4-amino-4'-[2-bis-$\beta$-hydroxyethylamino)-4-anilino- 1:3:5-triazyl-(6)-amino]-stilbene disulfonic acid-(2:2'), 4-amino-4'-[2-monoethylamino-4-anilino-1:3:5-triazyl-(6)-amino]-stilbene disulfonic acid-(2:2'), or 4-amino-4'-[2-(β-hydroxyethylamino)-4-monoethylamino-1:3:5-triazyl-(6)-amino]-stilbene disulfonic acid-(2:2') is used and after the condensation the final chlorine atom on the middle cyanuric ring reacted with aniline, monoethylamine, monoethanolamine or ammonia solution.

The initially mentioned 4-amino-4'-[2-(β-hydroxyethylamino)-4-anilino-1:3:5-triazyl-(6)-amino]-stilbene disulfonic acid-(2:2') is produced by condensation of 1 mol of cyanuric chloride with 1 mol of 4-nitro-4'-aminostilbene disulfonic acid-(2:2'), 1 mol of monoethanolamine and 1 mol of aniline with subsequent reduction by the Béchamps process.

The condensation product formed, of the formula

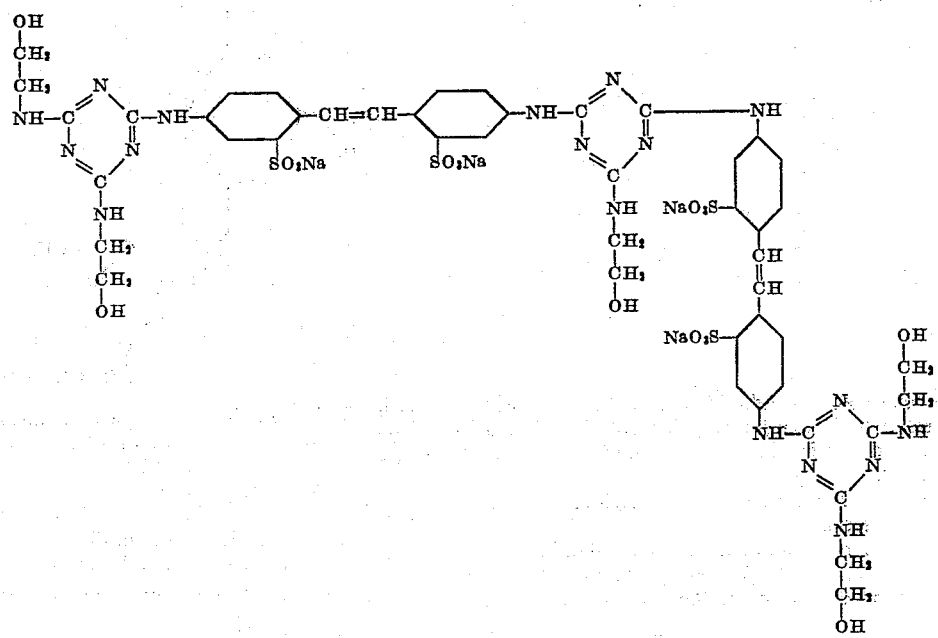

is separated by addition of sodium chloride, filtered, washed neutral with sodium chloride solution and dried. The new product is obtained as a light yellow, water-soluble powder.

By using instead of the final quantity of monoethanolamine equimolecular quantities of aniline or monoethylamine, products are obtained with similar properties. The products can be used as brightening agents for cellulosic materials.

*Example 5*

A solution of 18.5 parts of cyanuric chloride in 100 parts of acetone is stirred into a mixture of 100 parts of ice and 100 parts of water and to the suspension obtained, at 0–5° C. within 10–20 minutes, a solution, rendered neutral with sodium carbonate, of 114 parts of 4-amino-4'-[2:4-di-(β-hydroxyethylamino)-1:3:5-triazyl-(6)-amino]-stilbene disulfonic acid-(2:2') in 1000 parts of water added dropwise with stirring. Thereupon, to the reaction mixture obtained, within 1 hour, a solution of 5.5 parts of sodium carbonate in 50 parts of water is added dropwise in such a manner that the mixture continuously reacts neutral to weakly acid. Subsequently the temperature is raised within 1 hour to 30–35° C. and stirring is carried out for 3–4 hours at this temperature, the hydrochloric acid produced being, during this time, continuously neutralized by the gradual dropwise addition of a solution of 5.5 parts of sodium carbonate in 50 parts of water. A clear, amine-free and practically neutrally reacting solution is obtained. 15.2 parts of monoethanolamine are now added to the reaction mixture, the temperature is raised within 1 hour to 80° C. and stirring is carried on for 6–7 hours at 80–90° C.

*Example 6*

A solution of 18.5 parts of cyanuric chloride in 100 parts of acetone is stirred into a mixture of 100 parts of ice and 100 parts of water and to the suspension obtained, at 0–5° C. within 10 minutes, a solution, rendered neutral with sodium carbonate, of 60 parts of 4-amino-4'-[2-(β-hydroxyethylamino)-4-anilino-1:3:5-triazyl-(6)-amino]-stilbene disulfonic acid-(2:2') in 500 parts of water is added dropwise with stirring. Thereupon there is added dropwise to the reaction mixture obtained, within 1 hour, a solution of 5.5 parts of sodium carbonate in 50 parts of water, the addition being made in such a manner that the mixture reacts continually neutral to weakly acid. To the suspension which now no longer contains any free amino groups, there is added dropwise with stirring at 10–15° C. within 10 minutes, a solution, rendered neutral with sodium carbonate, of 53.6 parts of 4-amino-4'-[2:4-diethylamino-1:3:5-triazyl-(6)-amino]-stilbene disulfonic acid-(2:2') in 500 parts of water. Then the temperature is raised within 1 hour to 30–35° C. and stirring carried out for 3–4 hours at this temperature, the hydrochloric acid produced being continuously neutralized during this time by the gradual dropwise addition of a solution of 5.5 parts of sodium carbonate in 50 parts of water. A clear, amine-free and practically neutrally reacting solution is obtained. 23.3 parts of aniline are further added to the reaction mixture, the temperature is raised within 1 hour to 80° C. and stirring is carried on for 6–8 hours at 80–85° C.

The condensation product formed of the formula

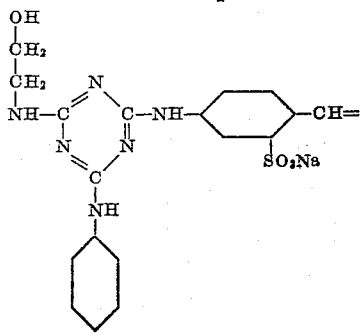

is separated by addition of sodium chloride, filtered, washed neutral with sodium chloride solution and dried. The new product is obtained as a water-soluble light yellow powder.

By using instead of the final quantity of aniline an equimolecular quantity of monoethylamine, a product is obtained with similar properties. The products can be used as brightening agents for cellulosic materials.

Products with similar properties are obtained when 1 mol of cyanuric chloride is condensed with 1 mol of 4-amino - 4' - [2 - ethylamino-4-anilino-1:3:5-triazyl-(6)-amino]-stilbene disulfonic acid-(2:2') and 1 mol of 4-amino - 4' - [2:4-di-(β-hydroxyethylamino)-1:3:5-triazyl-(6)-amino]-stilbene disulfonic acid-(2:2') and then reacting the final chlorine atom on the middle cyanuric ring with aniline or monoethanolamine.

*Example 7*

A solution of 18.5 parts of cyanuric chloride in 100 parts of acetone is stirred into a mixture of 100 parts of ice and 100 parts of water and to the suspension obtained, at 0–5° C. within 10 minutes, a solution, rendered neutral with sodium carbonate, of 58.3 parts of 4-amino-4'-[2-ethylamino - 4 - anilino - 1:3:5 - triazyl - (6) - amino] - stilbene disulfonic acid - (2:2') in 500 parts of water added dropwise with stirring. Thereupon there is added to the reaction mixture obtained, within 1 hour, a solution of 5.5 parts of sodium carbonate in 50 parts of water, the addition being made in such a manner that the mixture continuously reacts neutral to weakly acid. Into the suspension which now no longer contains any free amino groups, there is introduced dropwise at 10–15° C. within 10 minutes a solution, rendered neutral with sodium carbonate, of 61.3 parts of 4 - amino - 4' - [2 - bis - (β - hydroxyethylamino) - 4 - (β - hydroxyethylamino) - 1:3:5 - triazyl - (6) - amino] - stilbene disulfonic acid - (2:2') in 500 parts of water, with stirring. The temperature is then raised within 1 hour to 30–35° C. and stirring is carried on for 3–4 hours at this temperature, the hydrochloric acid produced being, during the whole of this time, continuously neutralized by gradual dropwise addition of a solution of 5.5 parts of sodium carbonate in 50 parts of water. A clear, amine-free and practically neutrally reacting solution is obtained. 21.8 parts of morpholine are now further added to the reaction mixture, the temperature raised within 1 hour to 80° C. and stirring carried on for 6–8 hours at 80–85° C. The condensation product formed of the formula

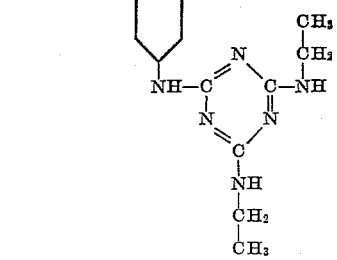
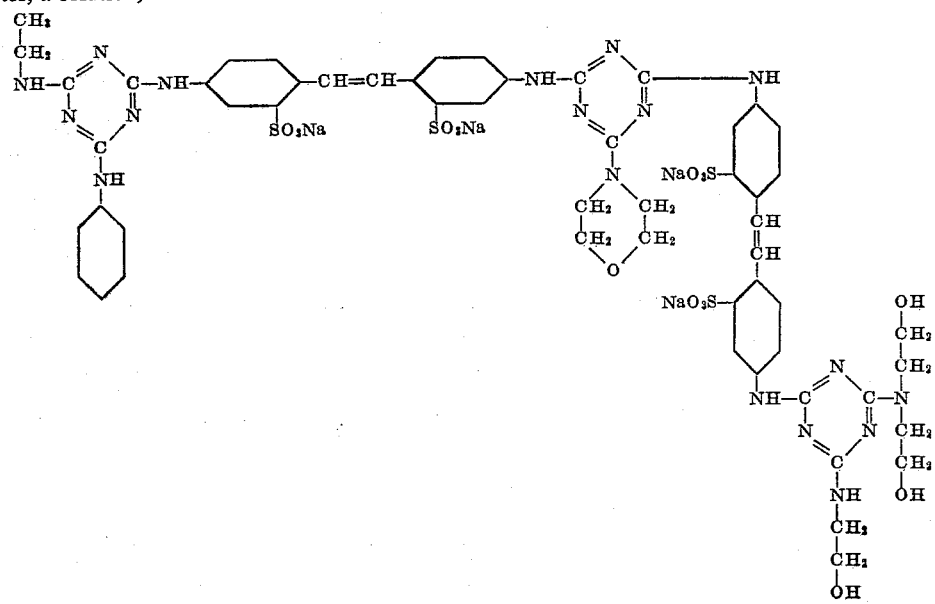

is separated by addition of sodium chloride, filtered, washed neutral with sodium chloride solution and dried. The new product is obtained as a light yellow water-soluble powder.

monoethanolamine are now added to the reaction mixture, the temperature raised within 1-2 hours to 60° C. and stirring carried on for 15-18 hours at 60-65° C.

The condensation product formed of the formula

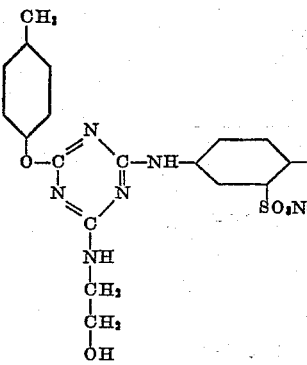
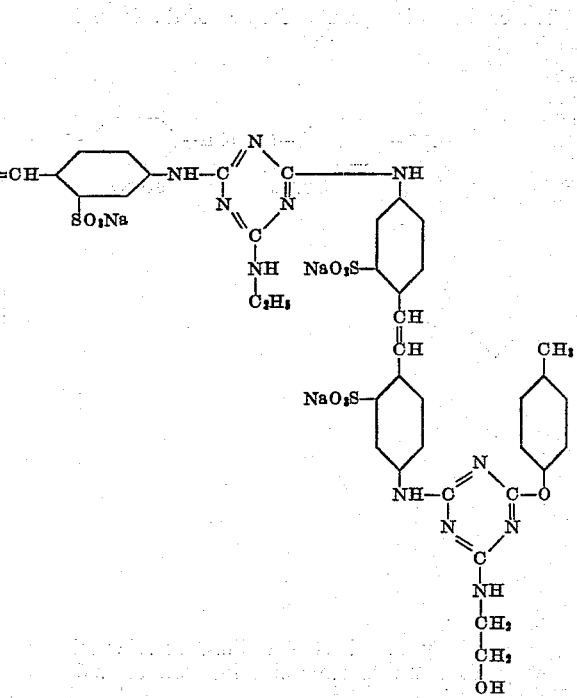

By using instead of the above mentioned quantity of morpholine an equimolecular quantity of diethylamine, a product is obtained with similar properties. The products can be used as brightening agents for cellulosic materials.

*Example 8*

Following the directions of Example 1, the condensation product of the formula

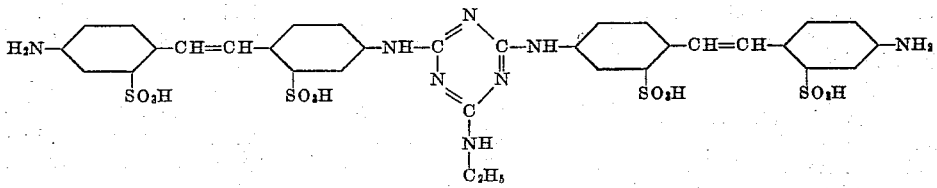

is produced by reacting together 2 mols of 4-nitro-4'-amino-stilbene disulfonic acid-(2:2'), 1 mol of cyanuric chloride and 1 mol of monoethylamine and the condensation product obtained is reduced by the process of Béchamps.

43 parts of the condensation product thus obtained are converted into a neutrally reacting solution in 250 parts of water with sodium carbonate and this solution is added dropwise, within 10-20 minutes at 0-5° C., to a suspension which has been produced by stirring 18.5 parts of cyanuric chloride dissolved in 100 parts of acetone into a mixture of 100 parts of ice and 100 parts of water. Thereupon, to the reaction mixture obtained, within 1 hour, a solution of 5.5 parts of sodium carbonate in 50 parts of water is added dropwise in such a manner that the mixture continuously reacts neutral to weakly acid. To the suspension which now no longer contains any free amino groups, 10.8 parts of p-cresol are added. Then the temperature is raised within 1 hour to 40° C. and stirring is carried out for 4 hours at 40-45° C., the hydrochloric acid produced being continuously neutralized during the whole time by the gradual dropwise addition of 100 parts of N-sodium hydroxide solution. A further 15.2 parts of is separated by addition of sodium chloride, filtered, washed neutral with sodium chloride solution and dried. The new product is obtained as a light yellow water-soluble powder.

By using instead of the p-cresol equimolecular quantities of phenol, thio-p-cresol or thioethylene glycol, products with similar properties are obtained. The products can be used as brightening agents for cellulosic materials.

*Example 9*

A solution of 18.5 parts of cyanuric chloride in 100 parts of acetone is stirred into a mixture of 100 parts of ice and 100 parts of water and to the suspension obtained, at 0-5° C. within 10 minutes, a solution rendered neutral with sodium carbonate, of 59.8 parts of 4 - amino - 4' - [2 - phenoxy - 4 - (β - hydroxyethylamino) - 1:3:5 - triazyl - (6) - amino] - stilbene disulfonic acid - (2:2') in 500 parts of water is added dropwise with stirring. Thereupon there is added dropwise to the reaction mixture obtained, within 1 hour, a solution of 5.5 parts of sodium carbonate in 50 parts of water, the addition being added in such a manner that the mixture continuously reacts neutral to weakly acid. To the suspension which now no longer contains any free amino groups, there is added dropwise with stirring at 10-15° C. within 10 minutes, a solution, rendered neutral with sodium carbonate, of 53.6 parts of 4 - amino - 4' - [2:4 - diethylamino - 1:3:5 - triazyl - (6) - amino] - stilbene disulfonic acid - (2:2') in 500 parts of water. Then the temperature is raised within 1 hour to 30-35° C. and stirring is carried on for 3-4 hours at this temperature, the hydrochloric acid produced being continuously neutralized during the whole of this time by the gradual dropwise addition of a solution of 5.5 parts of sodium carbonate in 50 parts of water. A clear, amine-free and practically neutrally reacting solution is obtained. 15.2 parts of monoethanolamine are now further added to the reaction mixture, the temperature is raised within 1–2 hours to 60° C. and stirring is carried on for 15–18 hours at 60–65° C.

The condensation product formed, of the formula condensation of 1 mol of cyanuric chloride with 1 mol of 4-nitro-4'-amino-stilbene disulfonic acid-(2:2') at 0–10° C., with 1 mol of phenol at 40–45° C. and with 1 mol of monoethanolamine at 60–65° C. and subsequent reduction by the method of Béchamps.

Example 10

The condensation product of the formula

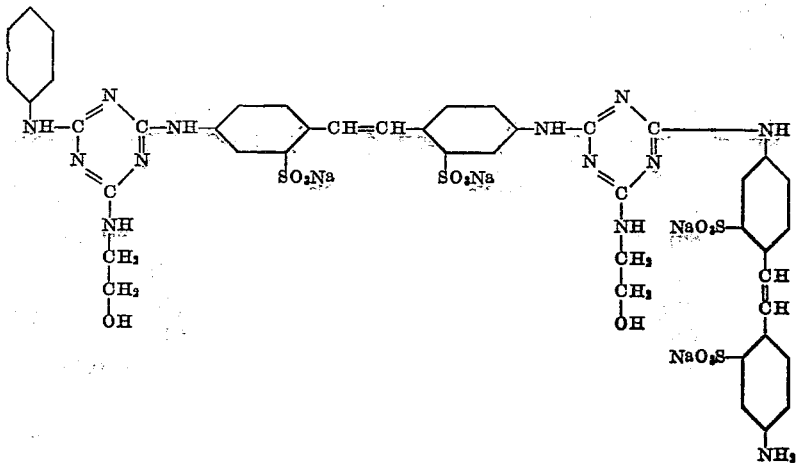

is produced when, following the directions of Example 6,

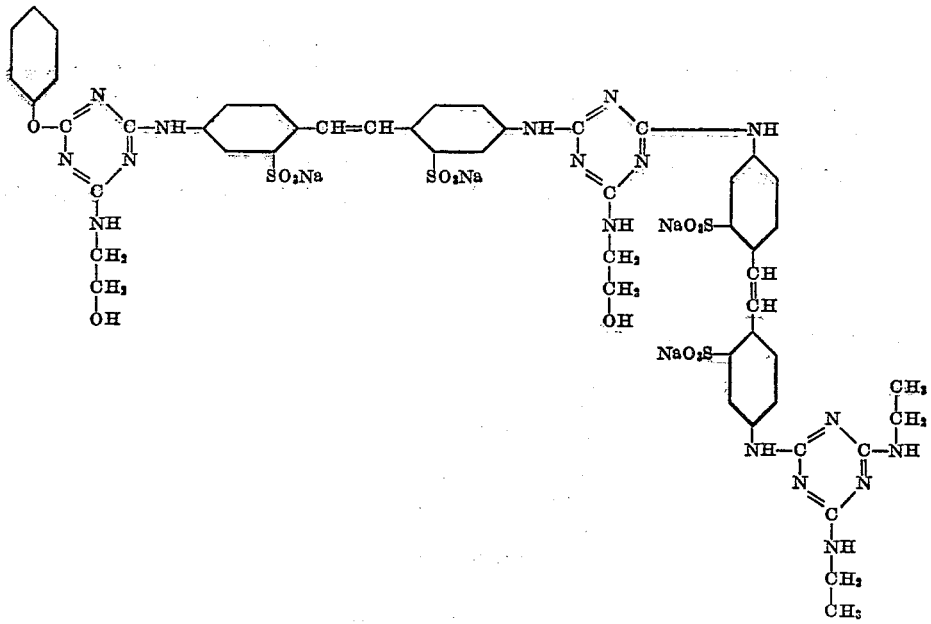

is separated by addition of sodium chloride, filtered, washed neutral with sodium chloride solution and dried. The new product is obtained as a light yellow water-soluble powder.

By using instead of the above mentioned quantity of monoethanolamine equimolecular quantities of monoethylamine or ammonia solution, products are obtained with similar properties. The products can be used as brightening agents for cellulosic materials.

Products with similar properties are likewise obtained when instead of the 4 - amino - 4' - [2:4 - diethylamino - 1:3:5 - triazyl - (6) - amino] - stilbene disulfonic acid - (2:2') equimolecular quantities are used of 4-amino-4'- [2 - phenoxy - 4 - (β - hydroxyethylamino) - 1:3:5 - triazyl - (6) - amino] - stilbene disulfonic acid - (2:2') or 4 - amino - 4' - [2 - phenyl - thio - 4 - ethylamino - 1:3:5 - triazyl - (6) - amino] - stilbene disulfonic acid - (2:2').

The initially mentioned 4 - amino - 4' - [2 - phenoxy - 4 - (β - hydroxyethylamino) - 1:3:5 - triazyl - (6) - amino] - stilbene disulfonic acid - (2:2') is produced by 1 mol of cyanuric chloride is condensed with 1 mol of 4 - amino - 4' - [2 - (β - hydroxyethylamino) - 4 - anilino - 1:3:5 - triazyl - (6) - amino] - stilbene disulfonic acid - (2:2'), 1 mol of 4-nitro-4'-amino-stilbene disulfonic acid-(2:2') and 1 mol of monoethanolamine with reduction of the condensation product obtained by the method of Béchamps.

A solution of 18.5 parts of cyanuric chloride in 100 parts of acetone is stirred into a mixture of 100 parts of ice and 100 parts of water and to the suspension obtained, at 0–5° C. within 10–20 minutes, there is added dropwise with stirring a solution, rendered neutral with sodium carbonate, of 119.3 parts of the condensation product above produced in 1000 parts of water. Then to the reaction mixture obtained, within 1 hour, a solution of 5.5 parts of sodium carbonate in 50 parts of water is added dropwise in such a manner that the mixture continuously reacts neutral to weakly acid. To the suspension which now no longer contains any free amino groups, 12.4 parts of 4-methylthiophenol are added. Then the temperature is raised within 1 hour to 40° C. and stirring is carried on for 4 hours at 40–45° C., the hydrochloric acid produced being neutralized throughout the whole time by the gradual dropwise addition of 100 parts of N-sodium hydroxide solution. 15.2 parts of monoethanolamine are now further added to the reaction mixture, the temperature is raised within 1–2 hours to 60° C. and stirring is carried on for 15–18 hours at 60–65° C.

The condensation product formed, of the formula

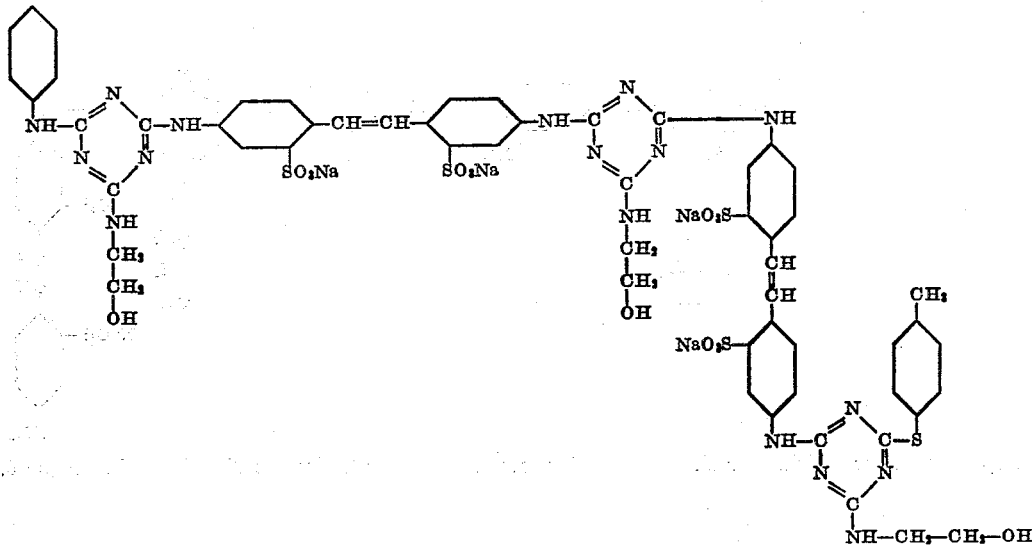

is separated by addition of sodium chloride, filtered, washed neutral with sodium chloride solution and dried. The new product is obtained as a yellow water-soluble powder.

A product with similar properties is likewise obtained, of the formula

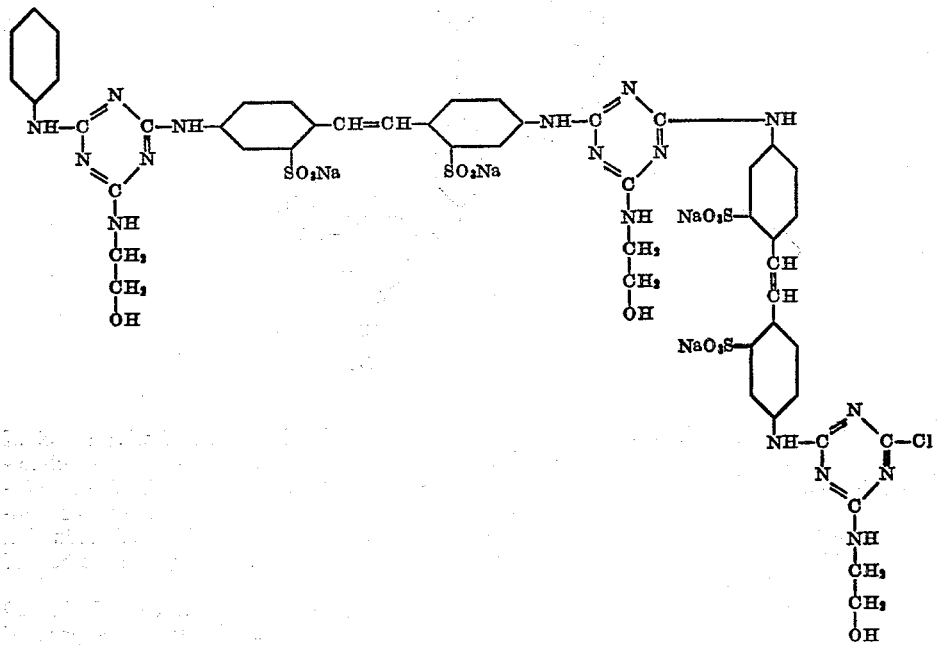

when instead of 4-methylthiophenol an equivalent quantity of monoethanolamine is used and the final chlorine atom is not replaced.

The products can be used for the brightening of cellulosic materials.

Example 11

Undyed cotton yarn is treated at room temperature for about ¼ hour, in a bath ratio of 1:30, in a bath which contains per litre 0.01 gram of the condensation product obtained according to Example 6. After rinsing and drying, the yarn thus treated possesses a higher white content than the corresponding untreated material.

Example 12

The sodium salt of 2-heptadecyl-N-benzylbenzimidazyl-disulfonic acid is mixed with 0.05–0.5 per cent. of the condensation product obtained according to Example 5. Undyed textile material which has ben washed in the customary manner with the mixture obtained, exhibits a brighter appearance than textile material which has been washed with the above specified sodium salt alone.

Example 13

Cotton is washed at the boil, in a bath ratio of 1:40, in a bath containing 10 grams of a washing agent of the following composition:

33.3 per cent. of soap,
11.0 per cent. of calcined sodium carbonate,
14.0 per cent. of sodium pyrophosphate,
7.0 per cent. of sodium perborate,
3.0 per cent. of magnesium silicate,
1.0 per cent. of the product obtainable according to Example 4 or 6, and
31.6 per cent. of water.

The material is rinsed and dried.

The cotton thus treated possesses a whiter appearance than similar material which has been washed with the same washing agent but not containing the addition of the product of Example 4 or 6.

*Example 14*

A paper pulp, containing 100 parts of paper, in a hollander, is first subjected to the addition of 2 parts of resin glue and after 15 minutes 2–4 parts of the product obtainable according to Example 3, dissolved in about 80 parts of water, are added. After a further 15 minutes 3 parts of aluminum sulfate are added. The paper pulp thus treated then passes to the paper machine by way of the heater.

Paper subjected to this treatment has a higher white content than untreated paper.

By using instead of the product produced according to Example 3, a compound obtainable according to Example 4, 5 or 6, a similar effect is obtained.

What is claimed is:

1. An alkali metal salt of a derivative of 4:4'-diamino-stilbene-disulfonic acid-(2:2) which corresponds to the formula

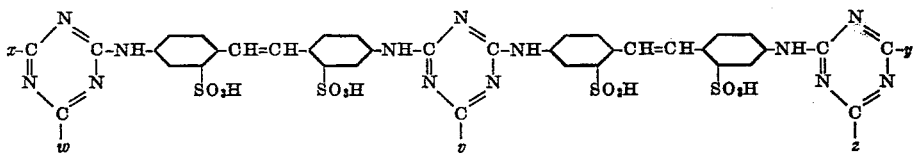

wherein each of $v$, $w$ and $z$ represents an amino radical attached by the amino nitrogen atom to the adjacent triazine ring and having at least one hydrogen atom attached to said amino nitrogen atom, said amino radical being selected from the group consisting of lower alkyl-amino, lower (hydroxy-alkyl)-amino, morpholino, and mononuclear carbocyclic aromatic amino; wherein, further, each of $x$ and $y$ is a member selected from the group consisting of —Cl, —NH₂, lower alkylamino, lower (hydroxyalkyl)-amino, morpholino, mononuclear carbocyclic aromatic amino, mononuclear carbocyclic aryloxy attached to the ariazine ring by the aryloxy oxygen atom, and mononuclear carbocyclic arylmercapto attached to the triazine ring by the mercapto sulfur atom, the respective amino groups being attached to the triazine ring by the amino nitrogen atom; and wherein each of $v$, $w$, $x$, $y$ and $z$ is free from groups which impart dyestuff characteristics to the molecule.

2. An alkali metal salt of a compound of the formula

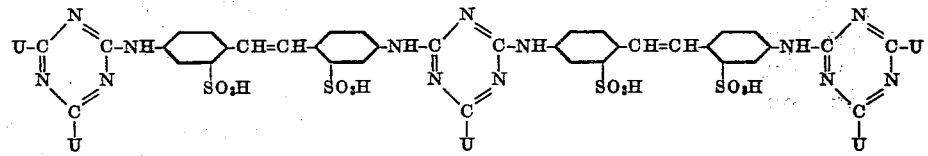

wherein each of at least two U's represents a radical of the formula

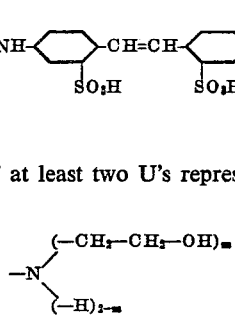

and each of the remaining U's represents —NH-phenyl, $m$ being a whole number of at the most 2.

3. An alkali metal salt of a compound of the formula

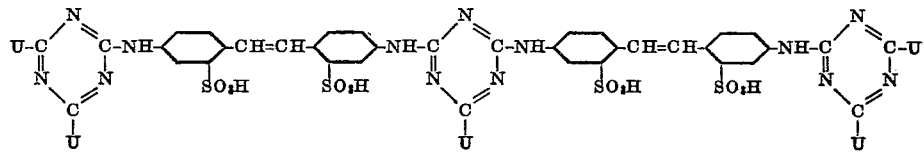

wherein each of at least two U's represents a radical of the formula

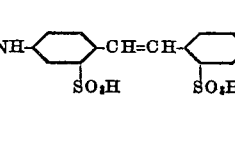

and each of the remaining U's represents —NH-ethyl, $m$ being a whole number of at the most 2.

4. The compound of the formula

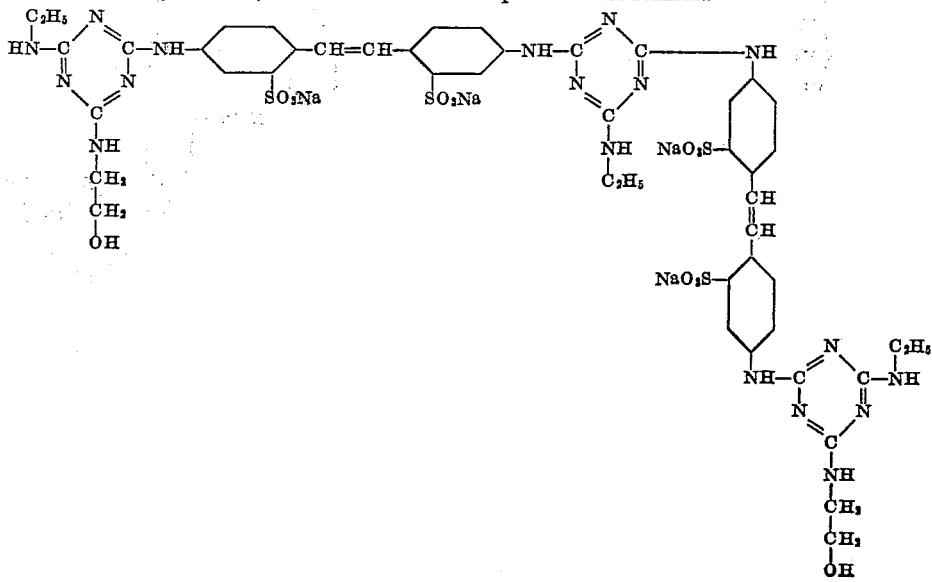

5. The compound of the formula
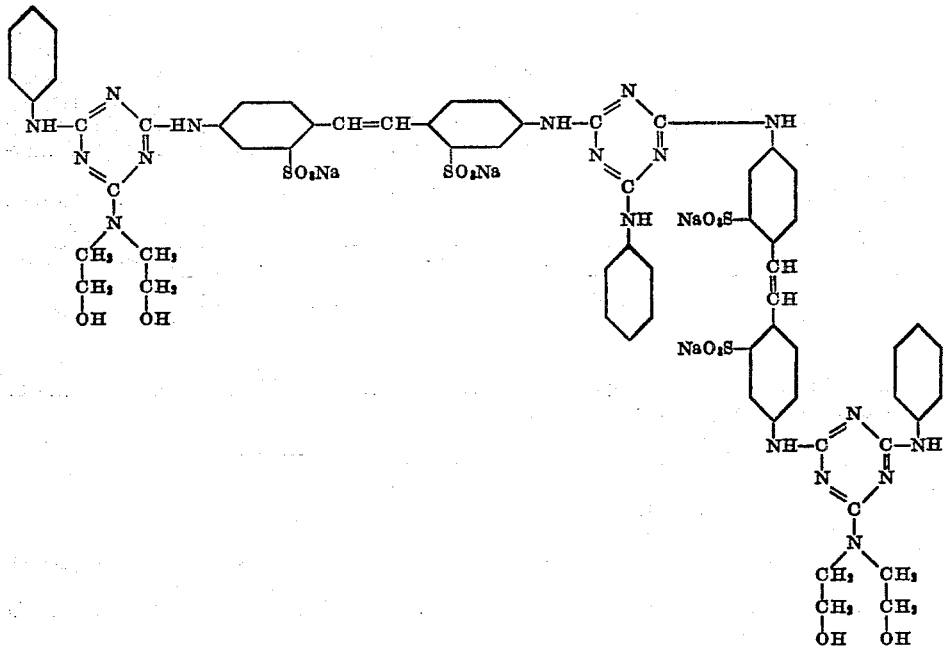
6. The compound of the formula
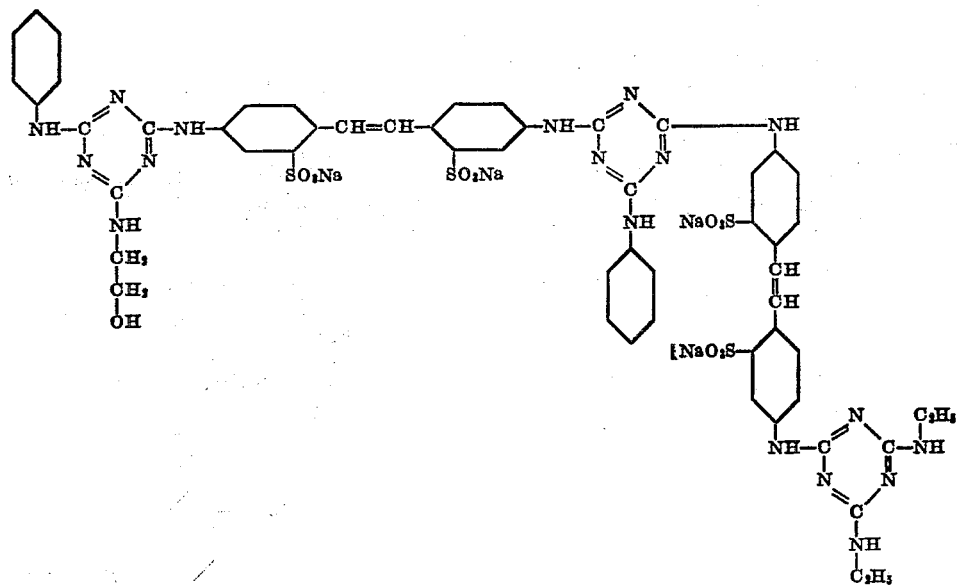

7. The compound of the formula
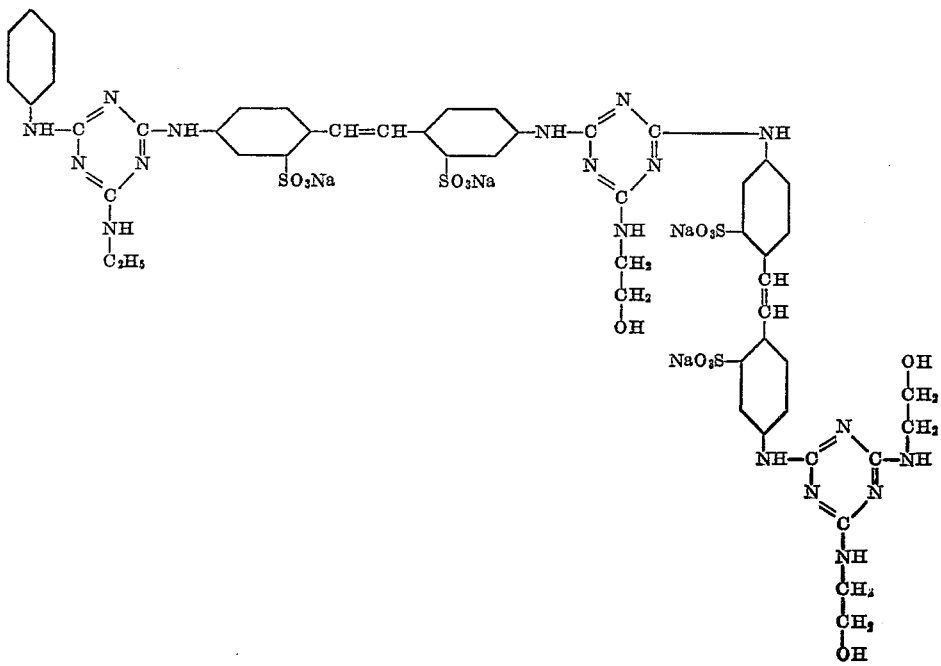
8. The compound of the formula
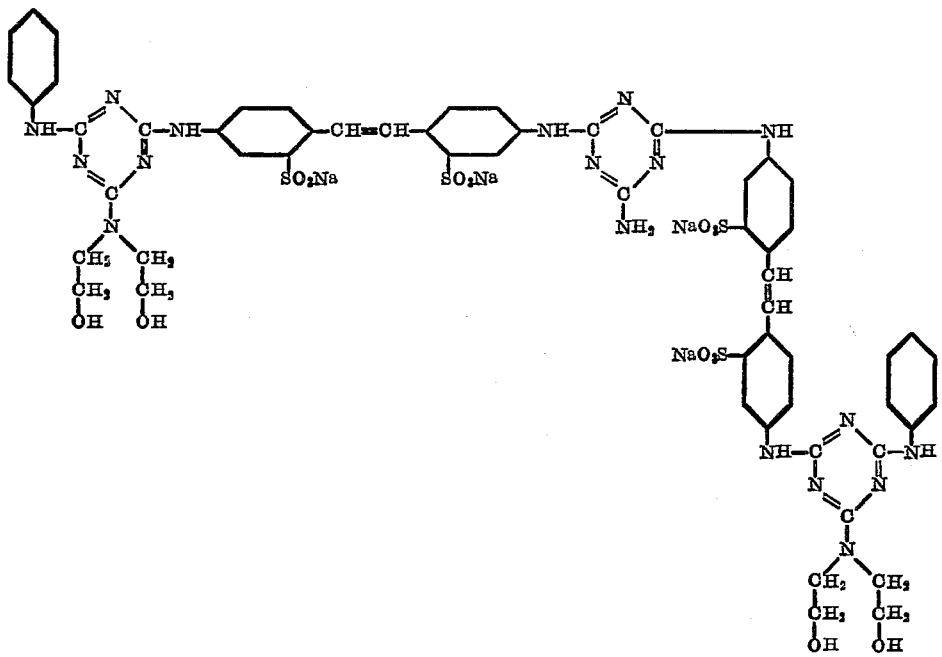
References Cited in the file of this patent
UNITED STATES PATENTS
2,376,743   Wendt _____ May 22, 1945